United States Patent
Kao et al.

(10) Patent No.: US 11,096,869 B2
(45) Date of Patent: Aug. 24, 2021

(54) MULTIPLE COMPARTMENTS DISPENSING CARTRIDGE

(71) Applicants: Quang Hong Kao, Richmond Hill (CA); John Yui Ki Poon, Thornhill (CA)

(72) Inventors: Quang Hong Kao, Richmond Hill (CA); John Yui Ki Poon, Thornhill (CA)

(*) Notice: Subject to any disclaimer, the term of this patent is extended or adjusted under 35 U.S.C. 154(b) by 0 days.

(21) Appl. No.: 16/388,305

(22) Filed: Apr. 18, 2019

(65) Prior Publication Data
US 2020/0330329 A1    Oct. 22, 2020

(51) Int. Cl.
| | |
|---|---|
| *A61J 7/04* | (2006.01) |
| *B65D 83/04* | (2006.01) |
| *B65G 1/137* | (2006.01) |
| *B65G 1/08* | (2006.01) |
| *A61J 7/00* | (2006.01) |
| *G05B 19/042* | (2006.01) |
| *A61J 1/03* | (2006.01) |

(52) U.S. Cl.
CPC ........... *A61J 7/0454* (2015.05); *A61J 7/0084* (2013.01); *A61J 7/0418* (2015.05); *A61J 7/0427* (2015.05); *B65D 83/04* (2013.01); *B65G 1/08* (2013.01); *B65G 1/137* (2013.01); *G05B 19/042* (2013.01); *A61J 1/03* (2013.01); *B65G 2201/027* (2013.01); *B65G 2203/0283* (2013.01); *B65G 2203/042* (2013.01); *B65G 2203/043* (2013.01); *B65G 2203/044* (2013.01); *G05B 2219/25257* (2013.01)

(58) Field of Classification Search
CPC ...... A61J 7/0454; A61J 7/0084; A61J 7/0418; A61J 7/0427; A61J 1/03; B65G 1/137; B65G 1/08; B65G 2201/027; B65G 2203/0283; B65G 2203/043; B65G 2203/044; B65G 2203/042; G05B 19/042; G05B 2219/25257; G05B 2201/027; G05B 2203/0283; G05B 2203/043; G05B 2203/044; G05B 2203/042; B65D 83/04
See application file for complete search history.

(56) References Cited

U.S. PATENT DOCUMENTS

| | | | | |
|---|---|---|---|---|
| 4,195,737 | A * | 4/1980 | Rysti | B07C 5/362 198/418 |
| 4,812,629 | A * | 3/1989 | O'Neil | G06K 17/0012 194/217 |

(Continued)

*Primary Examiner* — Michael Collins
(74) *Attorney, Agent, or Firm* — Nasser Ashgriz; UIPatent Inc.

(57) ABSTRACT

The present invention is a medication dispensing system and device comprising a multiple compartment dispensing cartridge made of rigid and flexible materials. The cartridge is preloaded with dispensable contents and inserted into the housing of the dispensing device. A flexible ribbon with an opening run through a plurality of slits in the vertical walls in a closed loop manner resulting in formation of compartments. The ribbon is moved, by a motor, such that the opening reaches a specific compartment at a specific time, thereby releasing the contents of that compartment at that time. Other features, such as a microcontroller is provided to control the dispensing date and time of the contents based on pre-determined conditions.

19 Claims, 13 Drawing Sheets

(56) References Cited

U.S. PATENT DOCUMENTS

| | | | | |
|---|---|---|---|---|
| 5,499,707 A * | 3/1996 | Steury | ............... | G07F 7/069 |
| | | | | 186/36 |
| 6,416,270 B1 * | 7/2002 | Steury | ............... | G07F 11/16 |
| | | | | 414/268 |
| 6,597,970 B1 * | 7/2003 | Steury | ............... | G07F 11/16 |
| | | | | 414/268 |
| 2016/0106622 A1 * | 4/2016 | Van De Wouw | ......... | A61J 1/03 |
| | | | | 206/534 |

* cited by examiner

MULTIPLE COMPARTMENTS DISPENSING CARTRIDGE

FIELD OF THE INVENTION

The present invention relates in general to dispensing devices and in particular to a medication dispensing device adapted to control the dispensing time for a period of days.

BACKGROUND OF THE INVENTION

Many patients have to take multiple medications several times a day. As the number of medications increases, it becomes more and more challenging for patients, especially for elderly patients, to keep track of all medications and the time of the medication they have to take. This can lead to taking medications at wrong times or not at all, resulting in potentially severe health consequences.

Currently, there are various devices for assisting patients with their medication compliance, including pill boxes in various configurations, such as daily and weekly ones. In the daily pill boxes, there are up to four box-shaped compartments, where medication can be slotted therein. Each of the compartments represent the different medication administration time, e.g., morning, noon, evening and bedtime. In the weekly pill boxes, the compartments are extended to include all 7 days in the week; usually having 28 compartments (4×7 configurations) in total. These pill boxes can be filled by the patient, a family member or a pharmacist to ensure putting the right medication into a compartment with the appropriate administration time. However, the onus is on the patient to identify, which time of the day it is, and then locate which compartment to open and take medications from it.

A similar compliance aiding device to the weekly pill boxes is the weekly blister pack. For this device, a pharmacist fills in different blisters (4×7) with medications and then seals them up. The patient identifies the day of the week and the time of that day and pushes out the medications from the specific blister. Similar to the weekly pill boxes, the onus is on the competency of the patient to identify the right blister to take medications from. If the patients are confused, it is possible that they take medications from the wrong time slot or take multiple slots of medications at a time, resulting in compromised health.

A different approach to assisting patients with their medications involves a smart system where each medication is stored in a different compartment of the device. The device is programmed to release a specific number of pills of different medications at a specific time. As a typical patient usually takes more than 5 different medications daily, this system accommodates plurality of compartments. Due to the complexity of these kind of systems and the fact that they need to accommodate multiple compartments of medications, they tend to be bulky, with sizes roughly that of a coffee dispenser. Hence, they cannot be easily carried around with a patient. Also, these systems require that the device to first identify which compartment to select, and then drop the correct number of pills from that compartment. If a patient is taking ten different types of medications, the device would need to accurately repeat the process ten time. Even one error in counting critical medications, such as Coumadin, a blood thinner, can be detrimental for a patient.

Therefore, there is a need for a portable and accurate medication dispensing device that is simple to use and easy to fill.

SUMMARY OF THE INVENTION

The present invention is a dispensing device, which receives a pre-loaded cartridge, containing a set of items to be dispensed. The cartridge comprises of multiple compartments.

In one embodiment the present invention is a medication dispensing device, which receives a pre-loaded medication cartridge, containing a set of medication designed for a medication regimen. The cartridge comprises of multiple compartments each containing medications for a specific day and time as prescribed. The preloaded cartridge is inserted into a housing of the dispensing device. The cartridge is divided into a number of small compartments. The compartments are formed by a set of vertical walls placed inside the cartridge to divide it into a number of vertical columns. The vertical walls have a set of slit openings at predetermined locations.

The cartridge also has a moveable ribbon or belt wrapped around a set of rollers inside the cartridge forming a closed loop. The rollers are set such that the ribbon or the belt forms a number of horizontal compartments inside the cartridge as the ribbon or the belt passes through the slit openings of the vertical walls. The rollers can be substituted by any friction reducing mechanism, such as smooth, curved guides. The cartridge is designed to sit upright and vertical, thereby each compartment of a vertical column is below an upper compartment, except for the first compartment on the upper most row. Although the cartridge is designed in a manner to dispense items by the force of gravity, however it is not desired to limit the invention to the exact dispensing mechanism and accordingly, other dispensing mechanism can be provided falling within the scope of the invention, eg: suction, inertia, magnetic, etc.

The ribbon has at least one aperture or opening. Once the opening of the ribbon goes into a particular compartment, the medications in that compartment is released to the compartment below it. A drive gear controls the movement of the ribbon. The drive gear is attached to a motor that is programmed to move the ribbon a certain distance at a specific time (e.g. morning, noon, evening and bedtime).

The compartments in the cartridge may be arranged to have any number of rows and columns. In one embodiment of the present device, the compartments are arranged in 4 columns by 7 rows, a total of 28 compartments. The four columns correspond to the dosing times of each day comprising: morning, noon, evening and bedtime and the seven rows correspond to seven days of the week. In operation a competent person (pharmacist or relative of the patient) fills the 28 compartments of the cartridge with medications.

The preloaded cartridge is then inserted into the dispensing device, which houses the motor along with computing hardware and software, which are programmed to rotate the motor in a certain number of rotations at specific times. The dispensing procedure is controlled by a microcontroller that is positioned inside the dispensing device. The microcontroller contains "safety critical software" that ensures contents to be dispensed with the correct predetermined conditions. Optionally, in some embodiments, the actuating member may be in communication with a timer and other components to automatically actuate the ribbon.

Therefore, it is an object of the present invention to provide a drug dispensing device that incorporates portability, simplicity and accuracy in the design of a dispensing system similar in arrangement to that of a familiar weekly pill box.

It is another object of the present invention to package a proper amount of the medication or other substances to be dispensed for a particular time in individual compartments instead of allowing the user access to a bulk supply.

It is another object of the present invention to provide a system in which an amount of the substance to be dispensed is precisely metered into the individual compartments by a competent person such a pharmacist or a relative, and is handed to the user.

It is another object of the present invention to dispense medications at a right day and time and preventing the patients from taking medications at a wrong day or time.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
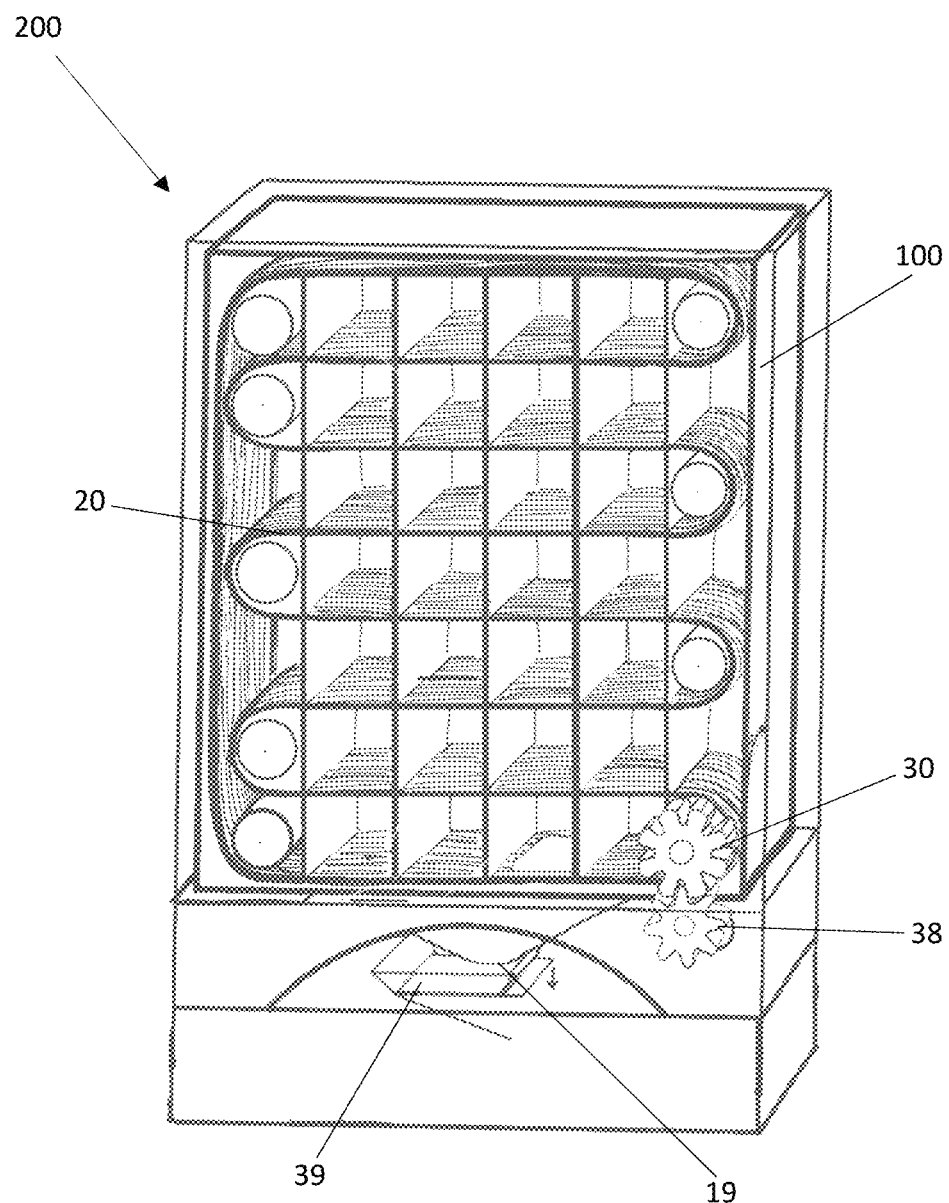
FIG. 1 is a perspective front view of the dispensing device according to the present invention.

FIGS. 1 to 6 show an embodiment of the present dispensing device 200 that is sized and shaped to house a cartridge 100 and other components of the dispensing device 200. The cartridge 100 is constructed from any rigid material and comprises an outer right wall 11, an outer left wall 12, an outer top wall 13, an outer bottom wall 14, and an outer back wall 15. The cartridge 100 comprises of a plurality of compartments 10 arranged in a number of rows and columns. The number of rows is selected based on the number of days the medications are used and the number of columns is selected based on the number of doses per day.

The compartment 10 has 4 columns and 7 rows, a total of 28 compartments. The four columns correspond to the dosing times of each day comprising: morning, noon, evening and bedtime and the seven rows correspond to the seven days of the week. Compartments 10 are formed from rigid vertical walls 16 on the sides and enclosed by the back wall 15. The compartments 10 of the top row C25, C26, C27 and C28 are bordered on the upper side by a rigid top wall 17. The front of the compartments remains open through which the medications of each compartment 10 are placed in. A plurality of slits 18 are provided on the vertical walls 16 of the compartments 10 through which a flexible ribbon 20 moveably run and form the horizontal walls of the compartments 10.

Figure 5:
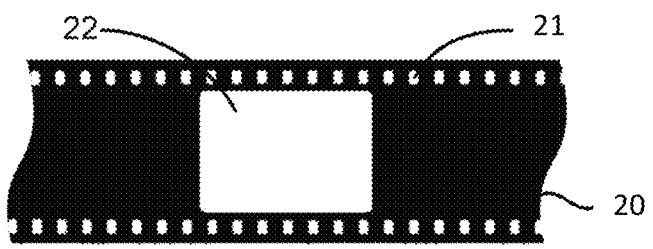
FIG. 5 is a partial view of the ribbon at the location of the bottom opening according to the present invention.
Figure 6:
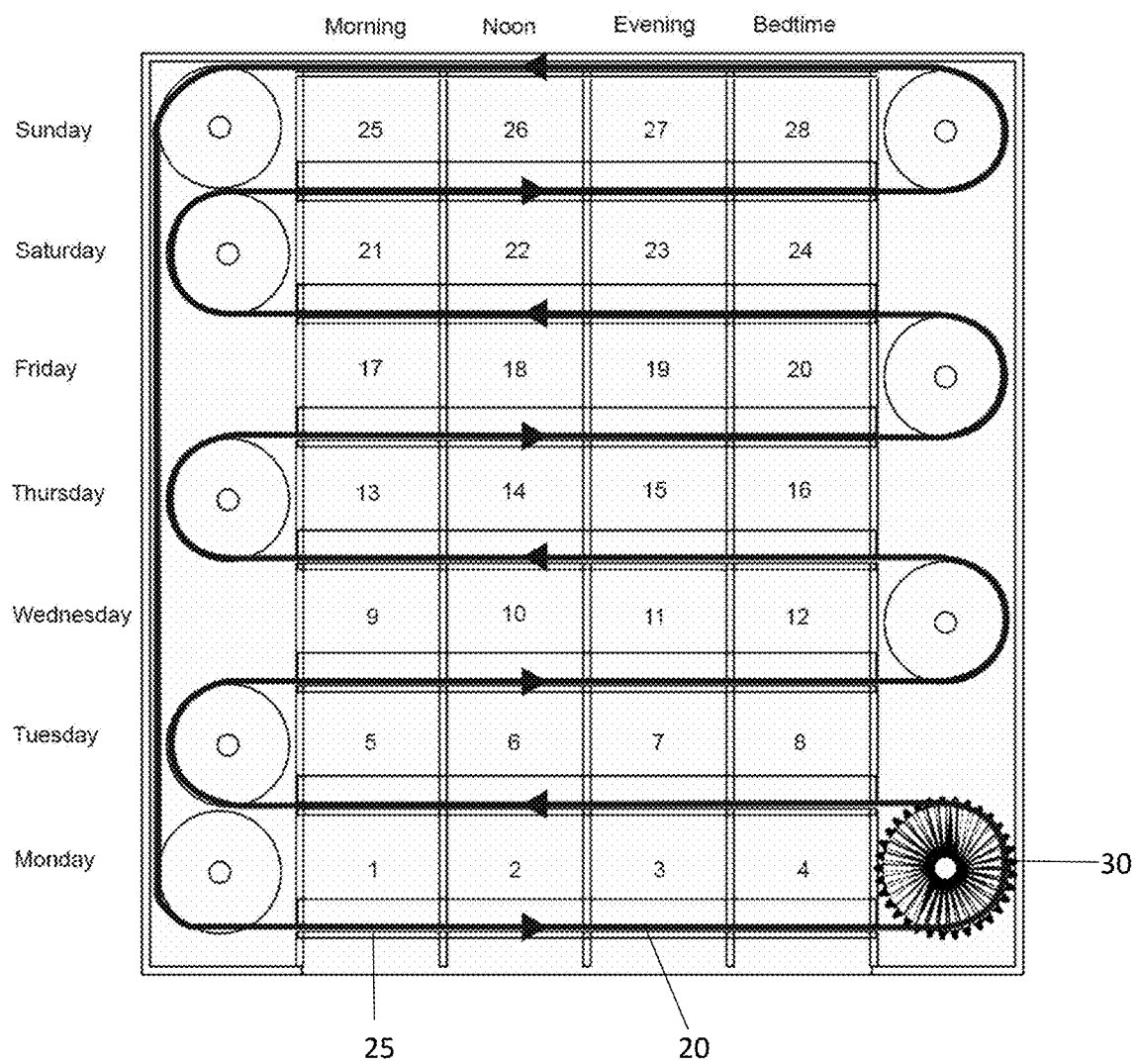
FIG. 6 is a top view of the compartments and the ribbon path of the present invention.

According to FIG. 5 the ribbon 20 is an elongated film made of flexible material and has perforations 21 along both sides much like a camera film. These perforations 21 catch onto the sprockets 32 of an actuatable member such as a drive gear 30. Along the entire ribbon 20, there is at least one dispense opening 22, with the same size and shape as the bottom of each of the compartment 10. The dispense opening 22 moves along the bottom of the compartments 10 as the motor rotates, in the direction as shown in FIG. 6, releasing medications into the compartment below or dispensing it through the bottom opening 19. Timing belts can also be used instead of ribbon. Timing belt have ridges on their bottom surface that catch on a gear system to cause motion.

The present device further comprises of a main gear 30 that engages with a dispensing device gear 38 when the cartridge 100 is inserted thereto. The dispensing device gear 38 is attached to a motor that is programmed to rotate by certain number of rotations at specific time (e.g. morning, noon, evening and bedtime). The main gear 30 as shown in detail in FIG. 4 comprises of a body 31 having sprockets 32 on its top and bottom portion in a distance on which the ribbon 20 can rotate. The drive gear 30 has a hole 33 in the centre portion which is placed on an axle. The main gear 30 further comprises gear teeth 34 on its end, which will connect with the dispensing device gear 38. When the motor rotates, the ribbon 20 moves inside the cartridge 100 in the manner thereby releasing the medications by gravity. It is to be understood other dispensing mechanism can also be provided eg: suction, inertia, magnetic, etc.

Figure 2:
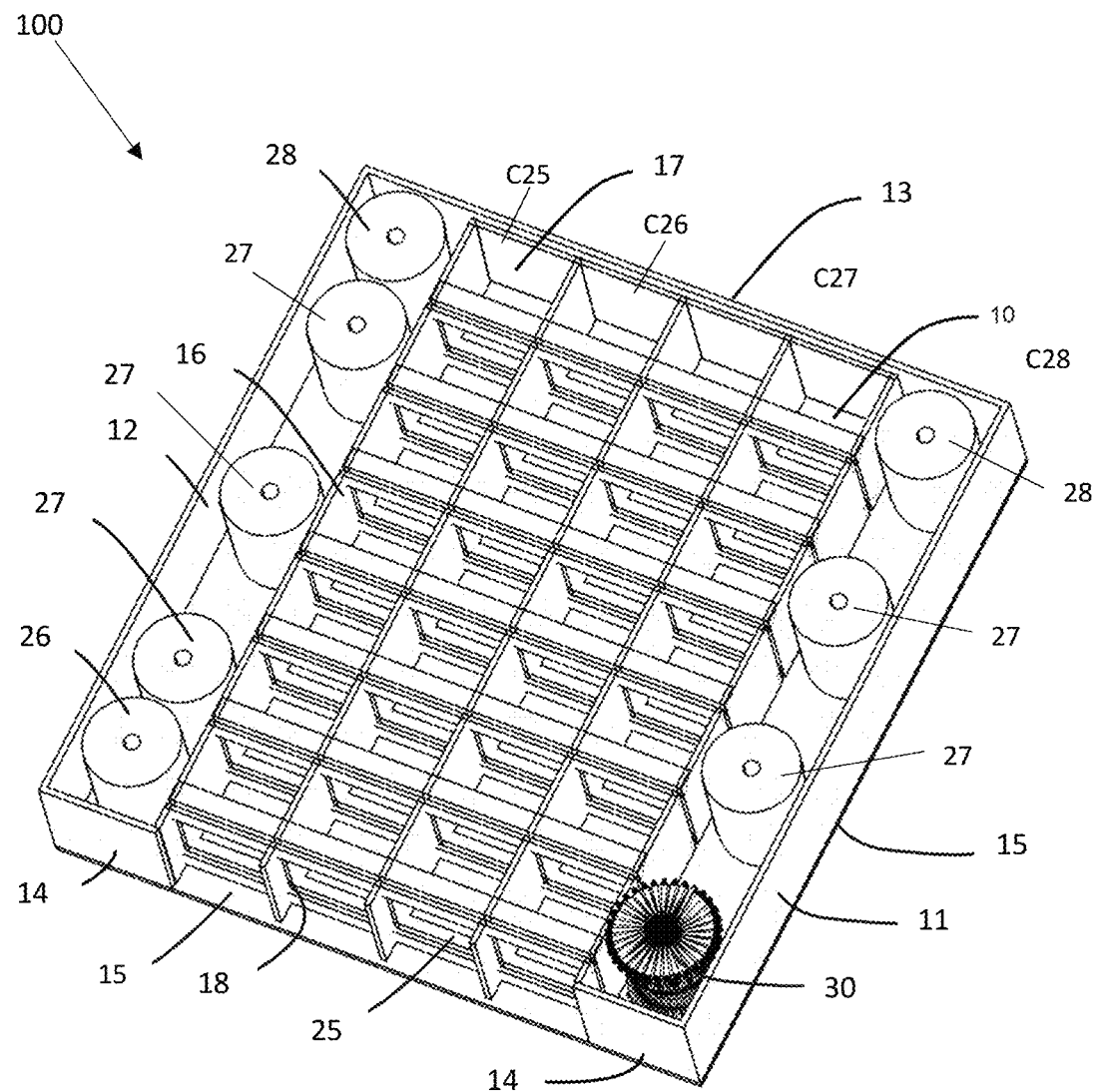
FIG. 2 is a perspective top view of the cartridge of the present invention.
Figure 3:
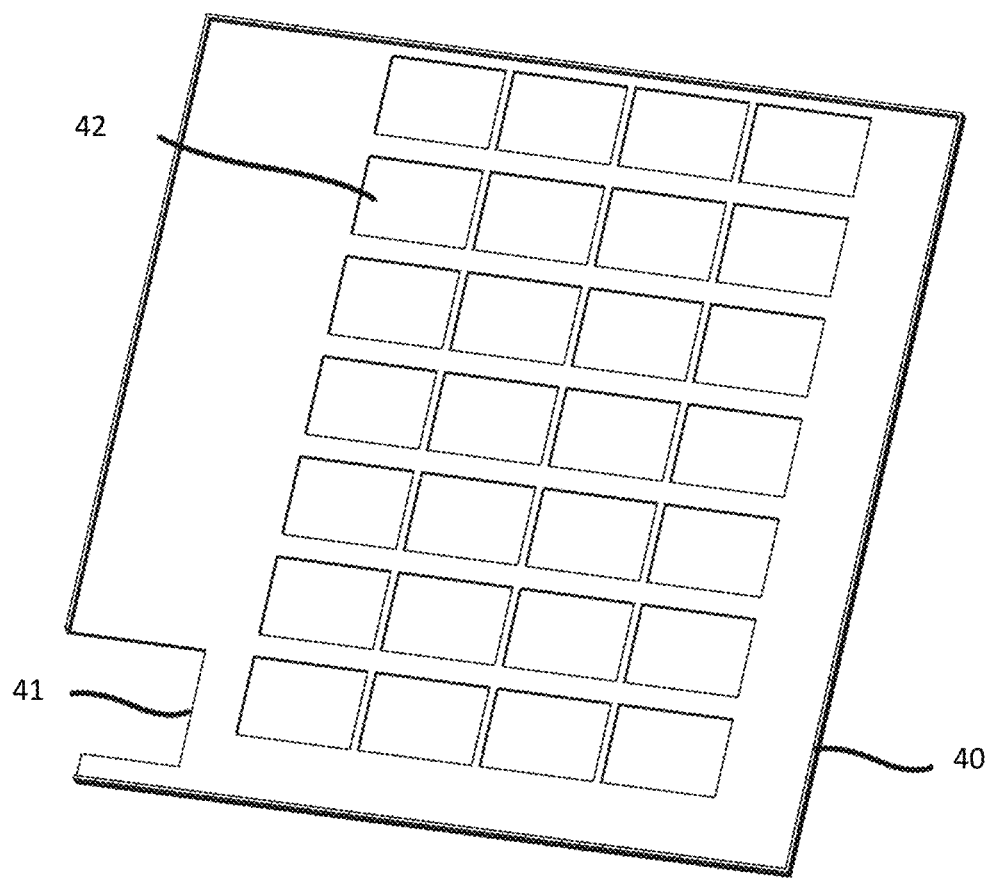
FIG. 3 is a perspective view of the cartridge lid of the present invention.
Figure 4:
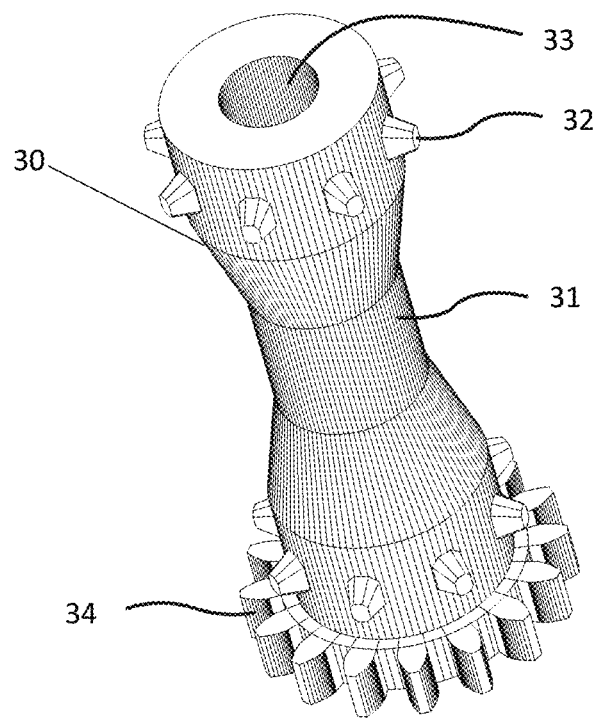
FIG. 4 is a perspective view of the main drive gear of the present invention.

According to FIG. 2 the cartridge 100 provide a set of rollers fixed in a space between the right wall 11 and the right-vertical wall 16, and a left set of rollers 27 fixed in a space between the left wall 12 and the left-vertical wall 16; the continuous ribbon 20 passes through the vertical walls 16 and rolls around left and right set of rollers to form a plurality of horizontal walls and a plurality of compartments formed by the intersections of the plurality of vertical walls 16 and plurality of horizontal walls. It is to be understood any friction reducing mechanism, such as a smooth, curved guides can be provided instead of rollers.

The close loop following the below-compartment-ribbon-guide 25, cartridge-bottom-ribbon-guide 26, end of rows rollers 27 and cartridge-top rollers 28. The ribbon 20 has a predefined length which is wrapped around the compartments in a loop shape following the below-compartment-ribbon-guide 25 and the slits 18 of the vertical wall 16 of the compartments 10. The ribbon 20 is actuated or moved to align the dispense opening 22 of the ribbon with the compartment, allowing the contents of the compartment to dispense. The dispense opening 22 is the same size and shape as the bottom of each of the compartments 10. The dispense opening 22 moves along the bottom of the compartments as the motor rotates, in the direction as shown in FIG. 6, releasing medications into the compartment below or dispensing it through the bottom opening 19.

Figure 7:
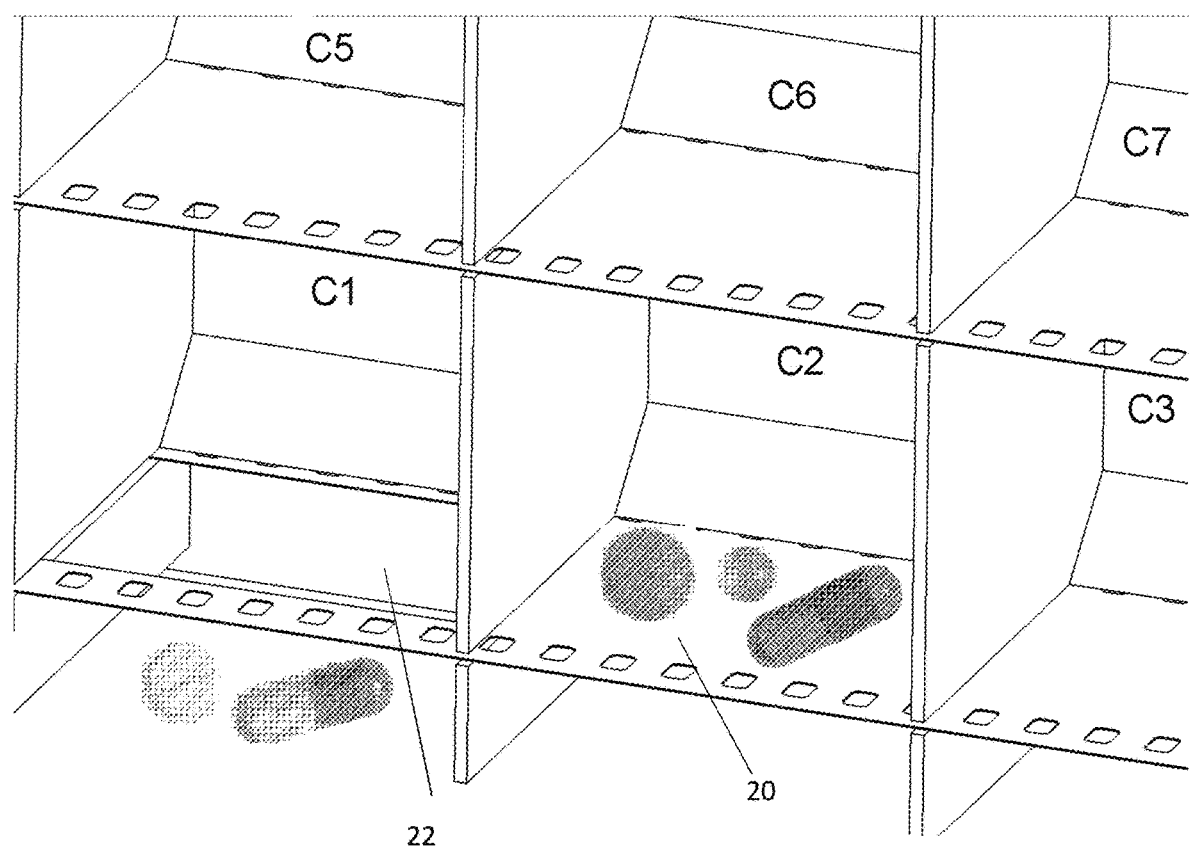
FIG. 7 is a close-up view of compartments 1, 2, 3, 5, 6, and 7 (C1, C2, C3, C5, C6, and C7) where the dispense opening reaches C1.
Figure 8:
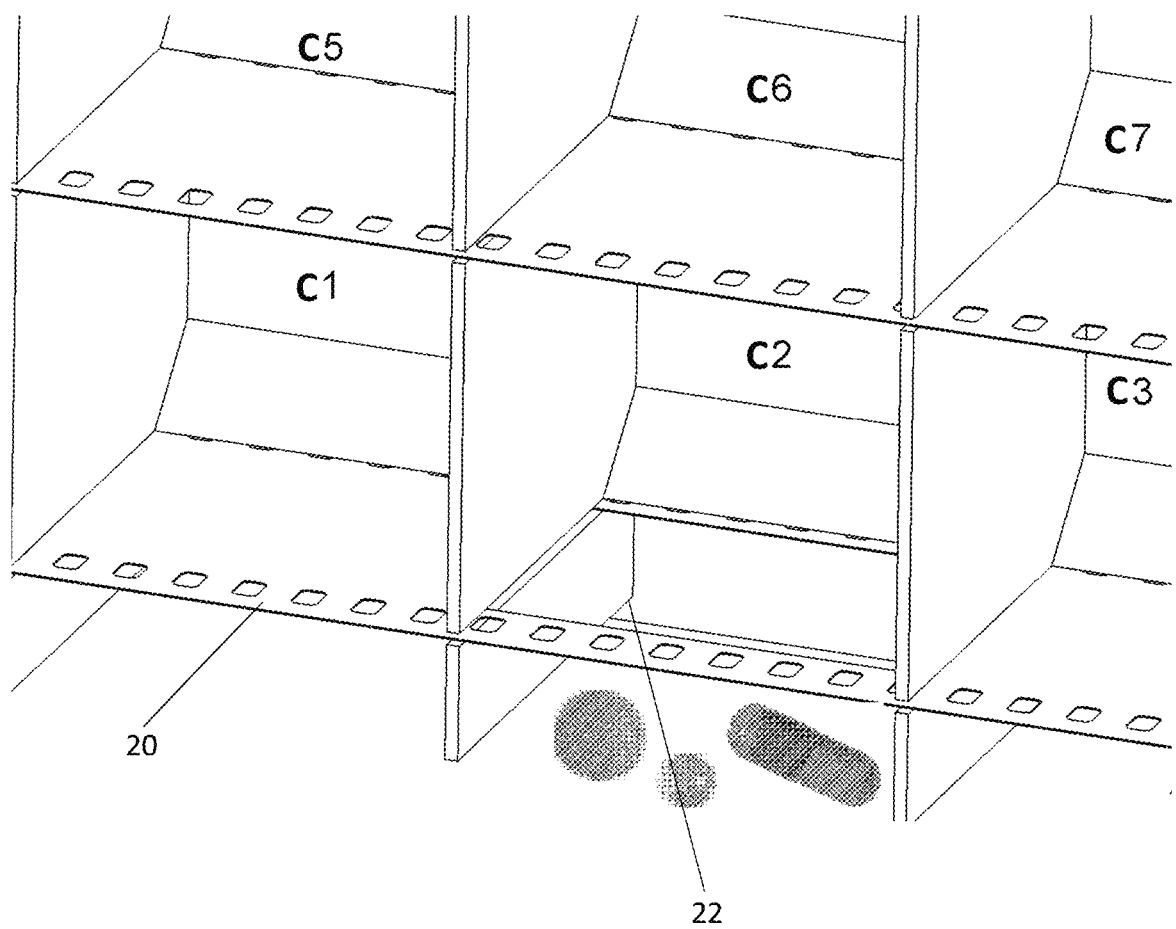
FIG. 8 is a close-up view of Compartments 1, 2, 3, 5, 6, and 7 (C1, C2, C3, C5, C6, and C7) where dispense opening reaches C2.

As shown in FIGS. 6 to 8 the ribbon 20 may be actuated and move in the direction as shown by the arrow. When the dispense opening 22 passes under compartment C1, all the medications in that compartment will fall through the bottom opening by gravity. This will be programmed to happen at a certain time, for example on Monday in the morning time, thus resulting in dispensing of medications for that time slot. The dispense opening 22 will continue to move until aligned with compartment C2 at later time, for example at the noon time. Again, releasing medications there through the bottom opening, as shown in FIG. 8. Likewise, in the evening time, the dispense opening 22 will move to compartment C3 and releasing its medications. Finally, at the bedtime, it will move to compartment C4, releasing all the medications.

Figure 9:
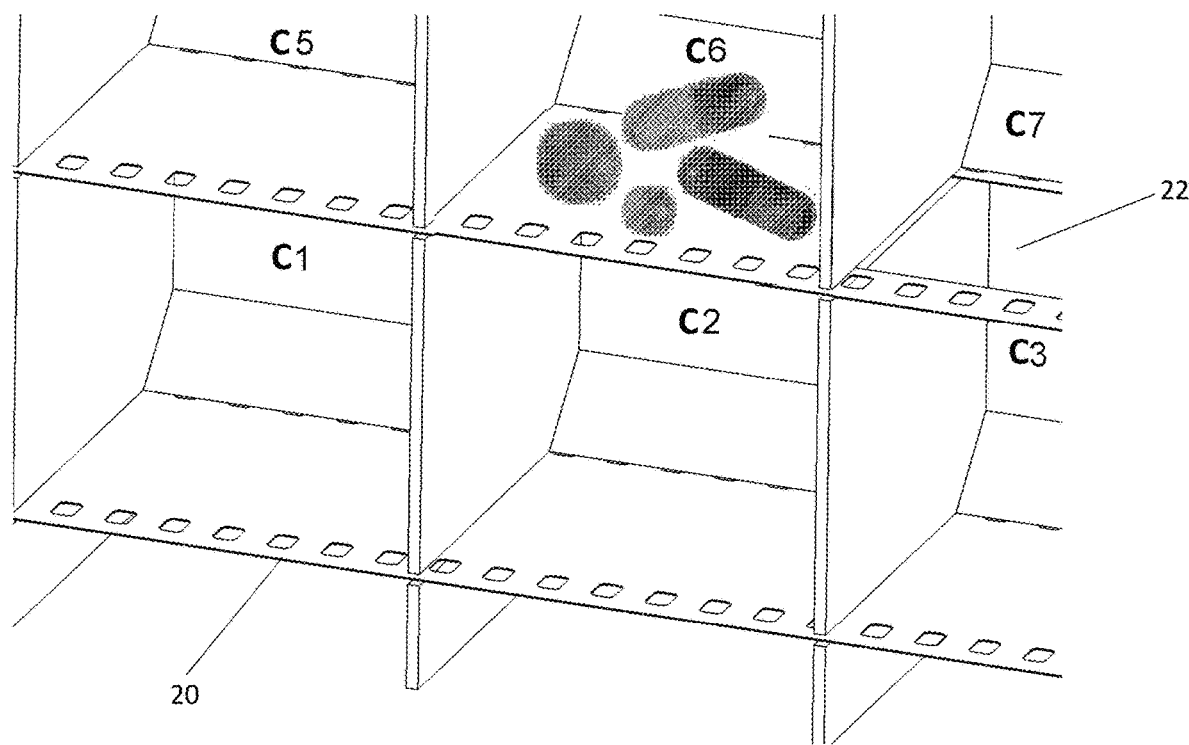
FIG. 9 is a close-up view of Compartments 1, 2, 3, 5, 6, and 7 (C1, C2, C3, C5, C6, and C7) where dispense opening reaches C7.
Figure 10:
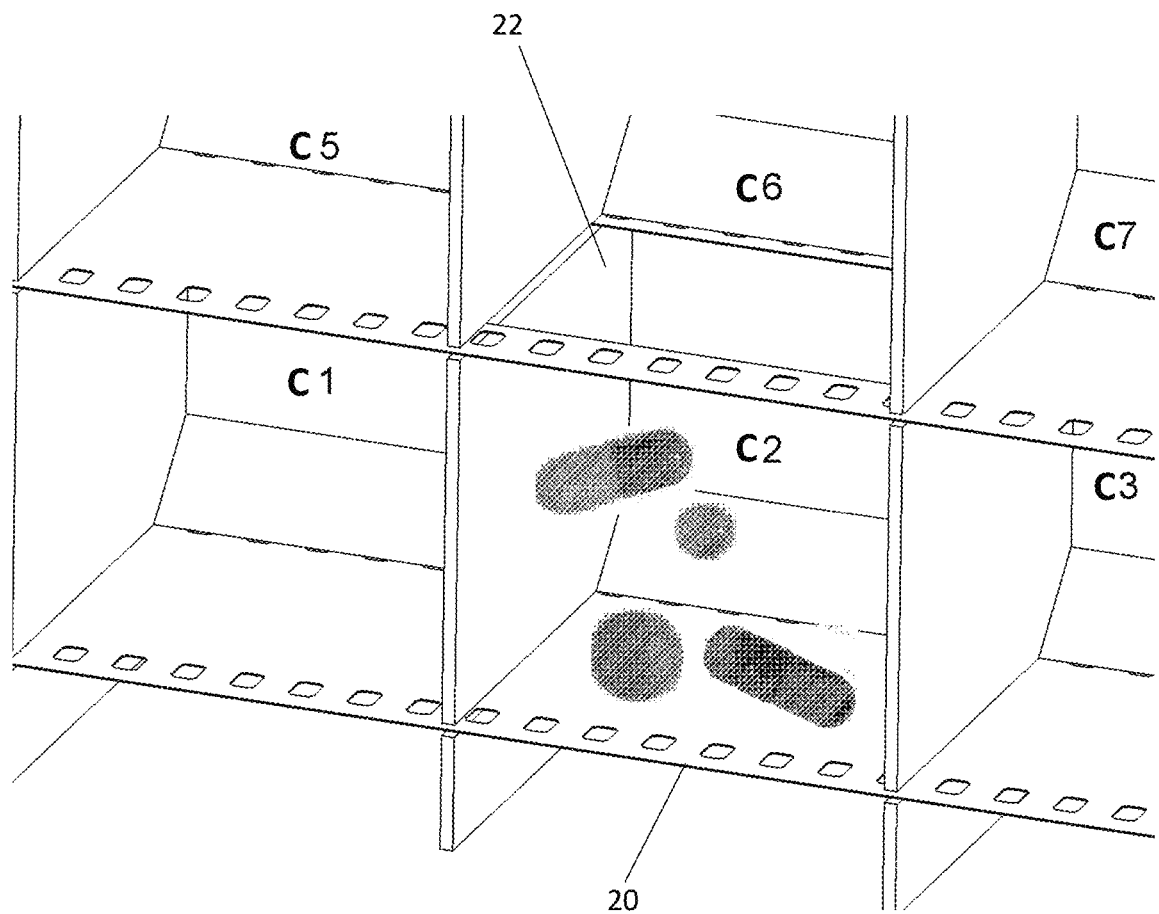
FIG. 10 is a close-up view of Compartments 1, 2, 3, 5, 6, and 7 (C1, C2, C3, C5, C6, and C7) where dispense opening reaches C6.

According to FIGS. 9 and 10, after all of the compartments on the first row (e.g. Monday) are empty, the ribbon will then move along for an entire cycle, until the dispense opening 22 comes back to the position right before compartment C1. Along the way, the bottom opening will pass under all the remaining compartments, dropping their contents to the compartment one row below them. For example, when the bottom opening passes under compartment C6, all of the medications in that compartment will drop down through to compartment C2. Likewise, when it reaches compartment C5, the contents there will then drop down to compartment C1 and so forth. Once the cycle is complete, the contents of each row have shifted down to the one below it. Hence, the medications originally for second row (e.g. Tuesday) are now in the first row (bottom most row) and ready to be dispensed at the start of a new cycle (day). This continues until all seven rows are emptied, which happens at the end of the week. The cartridge 100 is then ready to be refilled or exchanged for a new one.

The ribbon 20 may be actuated in any of a variety of ways. In the preferred embodiment the ribbon 20 of the dispenser device is actuated by a main drive gear 30. The main drive gear 30 is engaged with another gear on the dispensing device 38, which is attached to a motor that is programmed to cause rotation, translation and/or movement of the ribbon 20 by certain number of rotations at a specific time. The dispensing device 200 contains a power source to move the motor. The power source can be an electrical power supply or a battery. When the motor rotates, the ribbon 20 moves inside the cartridge 100 in the manner thereby releasing the medications by gravity. The ribbon perforations 21 engage with the gear sprockets 32 allow to perform a predetermined and controlled movement of the ribbon 20 in a direction. The cartridge 100 is closed with the cartridge lid 40 and then inserted into the dispensing device 200. According to FIG. 2 the lid 40 has an opening 41 for the main drive gear 30 and may have transparent windows 42. The cartridge 100 is removable from the dispensing device 200 and can be replaced with a different cartridge.

In operation, a competent person (pharmacist or relative of the patient) fills the 28 compartments of the cartridge 100 with medications for those specific compartments 10. For example, if on Monday in the morning, a patient takes 6 different medications, those medications would be accurately counted and filled into compartment C1. This process is repeated for noon, evening and bedtime and then for the rest of the week, following the 4×7 configurations.

Figure 11:
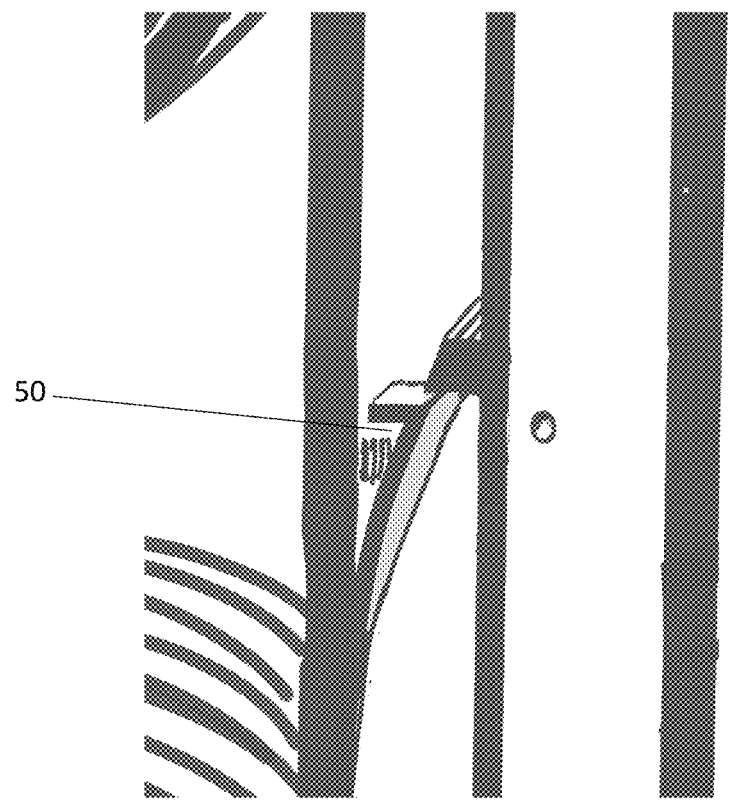
FIG. 11 shows the locking mechanism of the dispensing device.

The cartridge 100 is closed with the cartridge lid 40 and inserted into the dispensing device 200 which houses the motor along with other compartments and computing hardware and software that have been programmed to rotate the motor a certain number of rotations at specific time. According to FIG. 11 a locking mechanism 50 is provided to allow or prevent the cartridge from being removed from the dispensing device 200 based on predetermined conditions. The lock 50 is set manually or electrically when the cartridge is inserted and can be implemented by any locking mechanism such as latch, push-and-release locking mechanism or other fastening means.

When the cartridge 100 is inserted, the gear teeth 34 of the main drive gear 30 will connect with the dispensing device gear 38 which is connected to a motor. When the motor rotates, the ribbon 20 moves inside the cartridge 100 thereby releasing the medications by gravity. Thus, the dispense opening 22 is programmed to reach and dispense the contents of each of the 28 compartments sequentially at the correct day and time. The dispensing device provide an opening 19 on the bottom portion. The dispensed medications are dropped from the bottom opening 19 into a small tray 39 of the dispensing device 200. The dispensing device 200 may provide a physical button to allow the user to initiate dispensing.

In another embodiment the dispensing device 200 of the present invention is constructed of 2 dispensers, comprising two sets of moveable walls, and dispenses items in two different directions depending on which way the cartridge is oriented. The fixed vertical walls of the cartridge may be replaced by movable wall. These movable walls separate additional compartments that are stacked in front or behind each other and contain one or more bottom openings. Items to be dispensed can move from one compartment to an adjacent compartment in a similar manner and exit the cartridge via the outermost vertical wall.

Figure 12:
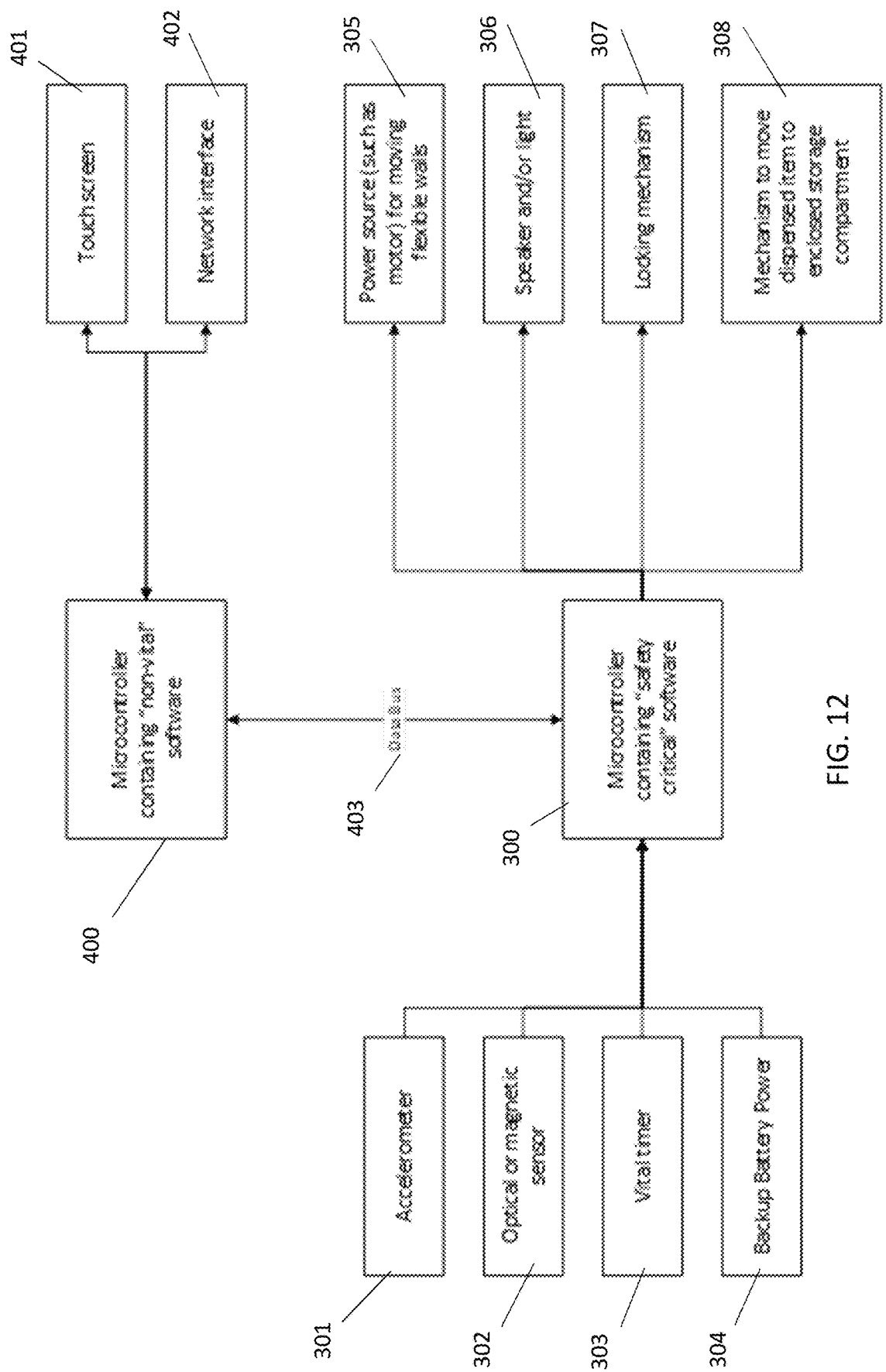
FIG. 12 is a block diagram showing additional features to operate the present invention.

FIG. 12 is a block diagram showing additional features to operate a reliable medication dispensing system. The present invention may contain means to connect to network interface (Ethernet, WIFI, Bluetooth, cellular, modem, or similar), which allows communication with an external network or devices. It is to be understood the features described herein can be implemented in whole, or in part using electronic hardware and software including a non-transitory computer-readable medium of program instructions.

A microcontroller 300 is provided in the device 200 to control the power source 305, which in this embodiment is an electrical power supply or battery that provides power to the motor and drive gear thereby control the movement of the ribbon in a pre-determined distance and stop the movement to allow the items to be dispensed. A safety-critical software in microcontroller controls the power source 305 of the device for contents to be dispensed with the correct predetermined conditions. The power source 305 can only be turned on or off by the microcontroller 300, therefore allowing or disallowing the items inside the cartridge to be dispensed based on pre-determined conditions.

The microcontroller 300 may work with an accelerometer 301 in the dispensing device 200. The microcontroller 300 uses this accelerometer 301 to determine that the cartridge 100 is in a vertical position to ensure the medications to be dispensed to move from one compartment 10 to another, via the force of gravity, whenever the bottom opening is at the bottom of the compartment.

An optical or magnetic sensor 302 is provided in the dispensing device 200 to allow the microcontroller 300 to sense the movement of the ribbon within the cartridge to ensure that dispensed items are in fact dispensed. A sensor may also be provided in the dispensing device 200 to allow the microcontroller 300 to detect if dispensed items are retrieved by the user.

A vital-timer 303 implemented in the hardware of the dispensing device 200 and the safety-critical software in the microcontroller 300 to ensure that items are dispensed within a range of a predetermined time. For example, 30 minutes before or after the correct dosing time. The vital-timer also determines timeouts for all dispensing functions.

A speaker and/or light 306, controlled by the safety-critical software in the microcontroller 300 is provided in dispensing device 200, to warn the user that an item will be dispensed.

A locking mechanism 307 is provided to allow or prevent the cartridge from being removed. The lock is controlled by the microcontroller 300. Therefore, the cartridge can be removed from the dispensing device based on predetermined conditions.

The dispensing device 200 may contain an enclosed storage compartment which can only be accessed by an authorized party via a key or similar mechanism. A mechanism is provided to move dispensed items from the tray 39 to the enclosed storage compartment, when the dispensed items on the tray were not retrieved by the user after a predetermined time 308. This mechanism is controlled by the microcontroller 300 based on conditions of the sensor 302 and the vital timer 303.

The dispensing device 200 may include a battery to provide backup power 304 in case the dispensing device is not powered. This ensures that the components in the device can operate without external power.

A touch sensitive screen 401 is provided on the dispensing device 200. The screen 401 acts as the main interface between the user and the dispensing device. The touch screen 401 can be mounted on the outer surface of the dispensing device 200 to play for example recorded reminder messages based on pre-programmed schedule. The screen 401 can be adjusted in various shapes and complexity according to the abilities of the user.

A second microcontroller containing non-vital software 400 is provided in the device. This microcontroller receives input and generates output from and to the screen 401. This microcontroller performs non-vital functions such as allowing users to modify dispensing times and frequency via the screen 401 or the network interface 402. A data bus 403 connects the microcontroller containing safety-critical software 300 with the microcontroller containing non vital software 400. The modified dispensing times or frequency are sent to the microcontroller containing safety critical software 300 via the data bus 403. The microcontroller will only allow modifications of the dispensing frequency and time if it falls within pre-determined conditions.

Figure 13:
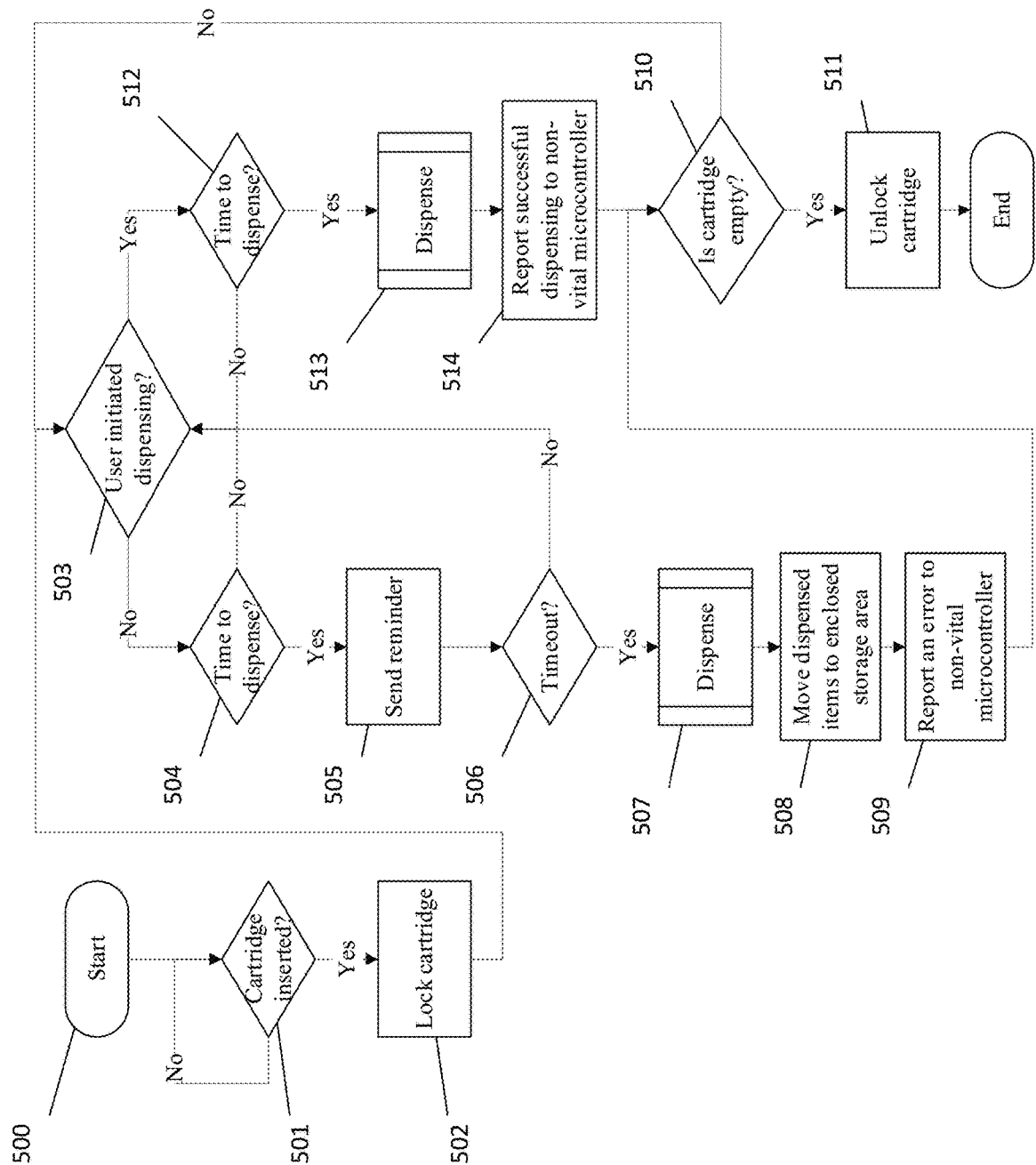
FIG. 13 is a block diagram showing the relationship between all the components of the present invention.

FIG. 13 is a flowchart showing the operation of the dispensing mechanism as controlled by the safety critical software 300. The system starts at block 500 and initiate if the cartridge is inserted into the dispensing device 501 and locked 502. If the user initiated dispensing 503, the items will be dispensed 513 and a report for successful dispensing will be sent to the non-vital microcontroller 514. If the system initiates that the items dispensed are not removed at the specific time 504, the system will send a reminder 505 and if the time is out 506, the item will be dispensed 507 and moved to the enclosed storage area 508. A report will be sent to the non-vital microcontroller for further action 509. If the system determines that all compartments have been dispensed, it will determine that the cartridge is empty 510 and unlock the cartridge 511, allowing it to be removed from the dispenser 200 and replaced with a new cartridge.

Figure 14:
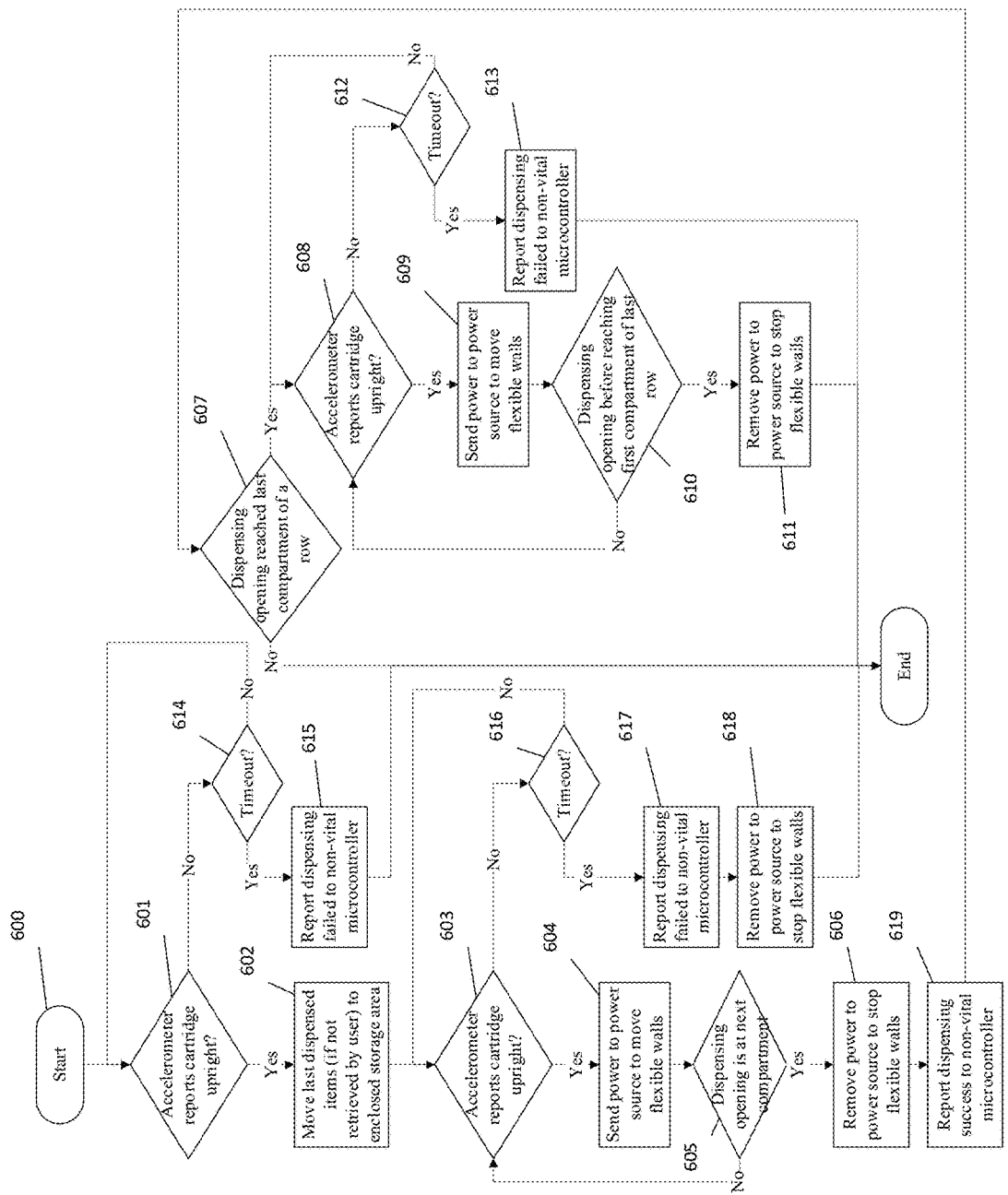
FIG. 14 is a block diagram showing how the components of the dispensing device operate together according to the present invention.

FIG. 14 is a flowchart showing the additional details of the safety-critical software 300 for the dispensing function. The process starts at block 600. If the accelerometer reports that the cartridge is in upright position 601, the last dispensed items, if not retrieved by the user, are moved 602. If the accelerometer reports that the cartridge is in upright position 603, the system sends power from the power source to the motor to move the flexible walls 604. (If the device is not in an upright position and the time is out 616 a report will be sent to the non-vital microcontroller that the dispensing is failed 617 and the flexible walls will stop 618).

The power is supplied to the motor to move the flexible wall until the dispense opening is at the next compartment 605, and then the power will be removed to stop the flexible wall 606. Then a report of dispensing success will be sent to non-vital microprocessor 619. This will repeat until the bottom opening reaches the last compartment of a row 607. When the bottom opening reaches the last compartment of a row 607 and the accelerometer reports that the cartridge is upright 608, power is supplied to move the flexible walls 609 until the bottom opening reaches the first compartment of the last row 610. (If the device is not in an upright position and the time is out 612 a report will be sent to the non-vital microcontroller that the dispensing is failed 613). Then the system removes the power to stop the flexible wall 611. At this point, the remaining contents in the cartridges will have moved down one row. If the accelerometer indicates that the device is not in an upright position 614 a report will be sent to non-vital microcontroller that the dispensing process is failed 615. A report will be sent to power source to remove the power 618 and the process ends.

It is to be understood that the cartridge in this application is designed in a manner to dispense items by the force of gravity, however it is not desired to limit the invention to the exact dispensing mechanism and accordingly, other dispensing mechanism can be provided such as suction, inertia, magnetic, etc. Thereby the bottom opening does not necessarily have to be at the bottom. If we use suction, the dispense opening can be in any direction, we may not even need accelerometer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A dispensing device comprising:
   a) a housing sized and shaped to receive a cartridge and designed to be placed in an upright vertical position, the housing having an upper part and a lower part, wherein the lower part has a bottom opening;
   b) the cartridge comprising:
      i) a top wall, a bottom wall, a removable front face, a rear wall, a right wall and a left wall, forming a substantially rectangular shape;

ii) a plurality of vertical walls fixed inside the cartridge to form a number of columns, having a right vertical-wall and a left vertical-wall, and wherein each vertical wall has a set of open slits;

iii) a right set of rollers fixed in a space between the right wall and the right-vertical wall, and a left set of rollers fixed in a space between the left wall and the left-vertical wall;

iv) a ribbon passed through said vertical walls and rolled around said left and right set of rollers to form a plurality of horizontal walls and a plurality of compartments formed by the intersections of said plurality of vertical walls and said plurality of horizontal walls, wherein the compartments in each column are stacked on top of each other, and wherein each compartment is initially filled by one or more items;

v) at least one aperture opening on said continuous ribbon;

vi) a gear mechanism to move the continuous ribbon inside the cartridge, and vii) a microcontroller to control the movement and timing of said continuous ribbon and said at least one aperture opening;

whereby, said at least one aperture opening travels through said plurality of compartments causing said one or more items in each compartment to drop from an upper compartment to a lower compartment adjacent to the upper compartment, until said one or more items reach a lowest row and exit from said bottom opening at a predetermined time.

2. The dispensing device of claim 1, wherein the number of rows is equal to a number of dosing times of a medication for each day, and the number of columns is equal to a number of days the medication is to be used.

3. The dispensing device of claim 1, further having an accelerometer in communication with said microcontroller to determine the upright vertical position of said cartridge, thereby enabling said one or more items in each compartment to drop by a force of gravity.

4. The dispensing device of claim 1, further having an optical or a magnetic sensor system in communication with said microcontroller to sense the movement of said plurality of movable horizontal walls based on a predefined distance.

5. The dispensing device of claim 1, further having a vital timer implemented in said microcontroller to ensure that said one or more items are dispensed within a range of a predetermined time.

6. The dispensing device of claim 1, further having a receiving tray to hold a set of dispensed items, said receiving tray has sensors to detect if said dispensed items are removed by a user in a pre-determined time.

7. The dispensing device of claim 1, further having a storage compartment to move said set of dispensed items from said tray to said storage compartment after a predetermined time, a timeout.

8. The dispensing device of claim 7, wherein said storage compartment is lockable by a key or similar mechanism to allow access only to authorized users.

9. The dispensing device of claim 7, wherein the timeout of said dispensing items is controlled by said sensors and said vital timer of said microcontroller.

10. The dispensing device of claim 1, further having a backup power that can operate the dispensing device without an external power.

11. The dispensing device of claim 1, further having a button to allow the user to manually initiate dispensing.

12. The dispensing device of claim 1, further having a network interface comprising of ethernet, WIFI, Bluetooth, cellular, modem, or similar to allow communication with an external networks or devices.

13. The dispensing device of claim 1, wherein said device provide a touch screen mounted on said device to enable said user to interact for said device.

14. The dispensing device of claim 1, wherein said dispensing device further having a locking mechanism to lock and unlock said cartridge in said dispensing device, said locking mechanism is controlled by said microcontroller.

15. The dispensing device of claim 1, further having an audio-visual alert system.

16. The dispensing device of claim 1, further comprising multiple cartridges to be placed into said housing.

17. A dispensing device comprising:

a) a housing sized and shaped to receive a cartridge and designed to be placed in an upright vertical position, the housing having an upper part and a lower part, wherein the lower part has a bottom opening;

b) the cartridge comprising:

i) a top wall, a bottom wall, a removable front face, a rear wall and two side walls forming a substantially rectangular shape;

ii) a plurality of vertical walls fixed inside the cartridge to form a number of columns;

iii) a plurality of movable horizontal walls arranged inside the cartridge to form a number of rows;

iv) a plurality of compartments formed by the intersections of said plurality of vertical walls and said plurality of movable horizontal walls, each compartment having a bottom surface and wherein the compartments on each column are stacked on top of each other, wherein each compartment is initially filled by one or more items;

v) a mechanism to move said plurality of moveable horizontal walls;

vi) a microcontroller to control the movement and timing of said plurality of movable horizontal walls, and vii) at least one aperture opening on each of movable horizontal wall;

whereby, said at least one aperture opening travels through said plurality of compartments causing said one or more items in each compartment to drop from an upper compartment to a lower compartment adjacent to the upper compartment, until said one or more items reach a lowest row and exit from said bottom opening at a predetermined time.

18. The dispensing device of claim 17, wherein each vertical wall has a set of open slits to allow each movable horizontal wall to pass through for a continuous motion.

19. The dispensing device of claim 17, wherein said mechanism to move the plurality of movable horizontal walls comprising: a gear mechanism, a set of rollers placed on a right and a left side of the number of columns, and one or more closed loop ribbons passing through the plurality of vertical walls and the set of rollers to form one or more moving ribbons.

* * * * *